United States Patent [19]
Pekar et al.

[11] Patent Number: 6,065,835
[45] Date of Patent: May 23, 2000

[54] LOW VISION ENHANCING OPTICAL SYSTEM WITH MOVABLE MIRRORS

[75] Inventors: Jaroslaw Pekar, Chapel Hill; Robert L. Beadles, Research Triangle Park; Henry A. Greene, Durham, all of N.C.

[73] Assignee: Ocutech, Inc., Chapel Hill, N.C.

[21] Appl. No.: 09/236,647

[22] Filed: Jan. 26, 1999

[51] Int. Cl.[7] .................................................. G02C 1/00
[52] U.S. Cl. .......................................... 351/158; 359/407
[58] Field of Search ...................... 351/158, 41; 359/407, 359/411–418, 480, 481, 482

[56] References Cited

U.S. PATENT DOCUMENTS 4,704,000  11/1987  Pekar et al. .
5,680,195  10/1997  Pekar et al. .

OTHER PUBLICATIONS

Goldberg, "Self–Focusing Infrared Telescopic Glasses May Restore Sight to Millions", Electronic Design, Apr. 14, 1997.

*Primary Examiner*—Hung Xuan Dang
*Attorney, Agent, or Firm*—Nixon & Vanderhye, P.C.

[57] ABSTRACT

An optical system is capable of enhancing vision of low vision individuals using a simple adjustment mechanism that requires a minimum length of travel to effect a desired adjustment. First and second substantially perpendicular mirrors are mounted in a cluster for substantially linear movement. A third mirror is substantially parallel to the first mirror and pivotal about an axis substantially transverse to the direction of linear movement of the cluster. Pivotal movement of the third mirror may be automatic in response to linear movement of the mirror cluster so as to ensure substantially proper convergence when the object to be viewed is about one meter (or closer) from the objective lens or lenses in a binocular system. A fourth mirror is substantially parallel to the second mirror and substantially perpendicular to the third mirror. An objective lens cooperates with the first and third mirrors, and an eyepiece lens with the second and fourth mirrors. The system, whether monocular or binocular, may be mounted on eyeglasses.

19 Claims, 9 Drawing Sheets

LOW VISION ENHANCING OPTICAL SYSTEM WITH MOVABLE MIRRORS

BACKGROUND AND SUMMARY OF THE INVENTION

Vision enhancing systems for a low vision individuals have made significant advances in the past few years. As shown by U.S. Pat. Nos. 4,704,000 and 5,680,195, vision enhancing system now may be provided that are light enough to be mounted on eyeglasses. And as shown in an article by Goldberg in *Electronic Design*, Apr. 14, 1997, entitled "Self-Focusing Infrared Telescope Glasses May Restore Sight to Millions", such low vision systems may include auto focusing While enormous strides have been made, it is desirable to provide an optical system for low vision individuals that is even lighter, and has more effective and efficient focusing, and that is well suited for autofocusing such as discussed in the Goldberg article.

One of the key features of the present invention that allows a lightweight, efficient, and effective, system is the provision of a mirror cluster. Two mirrors are provided mounted in the cluster at an angle of about 90° to each other, and for substantially linear movement. This arrangement of the mirrors provides two units of focus for every one unit of travel, making focusing quicker and easier. While the same basic results could be achieved by moving prisms instead of mirrors, mirrors are much lighter in weight than prisms and therefore are much more suitable to low vision systems, particularly those that must be light enough to be mounted on eyeglasses.

According to one aspect of the present invention, a vision enhancing optical system is provided comprising the following components: An objective lens. An eyepiece lens. A mirror cluster comprising first and second substantially planar mirrors which are disposed at an angle of substantially 90° with respect to each other. And, the mirror cluster mounted for movement in a substantially linear path with respect to the objective and eyepiece lenses. The objective and eyepiece lenses may be mounted on substantially parallel lines of sight, in which case the mirror cluster substantially linear path of movement is substantially transverse to the lines of sight.

The optical system of the invention preferably further comprises a third mirror disposed optically closer to the objective lens than the eyepiece lens; and a fourth mirror for directing light reflected by the mirror cluster to the eyepiece lens. Preferably the above-recited optical components comprise a first set, and the system further comprises a second set of optical components including an eyepiece, lens and four mirrors substantially identical to the optical components of the first set, the mirror cluster of the second set facing (or facing away from) the mirror cluster of the first set, and wherein the first and second sets comprise a binocular system.

In binocular systems, the pupillary distance (that is how far apart an individual's pupils are) must be accommodated. This can be accommodated by allowing decoupling of various components in the system of the invention, and reattachment once adjusted. An easy to adjust (but also easy to move out of adjustment) mechanism for this purpose such as found in conventional binoculars is not necessary because the system of the invention will not be normally be used by more than one or a few people.

Binocular systems also need to ensure "convergence". When an object to be viewed is from about three feet (one meter) to about ten-twelve inches (30 cm) from the objective lens or lenses of a binocular system, unless some adjustment of the optical components is effected, it is not possible to maintain a fused binocular image. Convergence is provided according to the invention by mounting each third mirror pivotally, for pivotal movement about a pivot axis substantially perpendicular to the substantially linear path of movement of the mirror cluster. Preferably means are provided for automatically pivoting each third mirror in response to movement of the mirror cluster to maintain a substantially constant optical relationship between the mirror cluster and the third mirror, and to provide a fused binocular image for objects about one meter or less from the system.

The automatic pivoting means may comprise any conventional structure which effects pivotal movement of one component to which it is connected while allowing relative linear movement of that component with respect to another. In the preferred embodiment according to the invention the automatic pivoting means comprises a cam, a cam follower, and a link connecting the cam follower to the third mirror, the link including a slip joint allowing relative linear movement between the third mirror and the mirror cluster while translating movement of the cam follower to pivotal movement of the third mirror. Alternatively the means for automatically pivoting may comprise a link connected to the mirror cluster, and an arm having a lost motion connection to the third mirror. [An adjustment mechanism connecting the link to the arm may also be provided to accommodate different pupillary distances.] In any event, pivoting action is initiated only when—as perhaps sensed by the position of the self-focusing mechanism—the object to be viewed is about one meter away.

In the preferred embodiment the third and fourth mirrors are substantially perpendicular to each other, and the first and second mirrors are substantially perpendicular to each other, and the fourth mirror is substantially parallel to the second mirror.

A number of different housing arrangements may be provided for the optical components. For example the third mirrors of the first and second sets may be mounted in a first housing, with the mirror cluster, eyepiece lens, and fourth mirror of the first and second sets, respectively, mounted in second and third housings, respectively. The objective lens may be operatively mounted with the first housing and comprise a common objective lens to both the first and second sets of optical components, or the second set of optical components may include its own objective lens, with the optical components of the first set mounted in a first housing and those of the second set mounted in a second housing.

According to another aspect of the present invention an optical system is provided comprising the following components: A mirror cluster comprising first and second substantially planar mirrors disposed at an angle of substantially 90° with respect to each other. The mirror cluster mounted for movement in a substantially linear path. And, a third mirror disposed for optical cooperation with the first mirror, the third mirror generally parallel to the first mirror, and pivotal about an axis substantially perpendicular to the substantially linear path. The system typically also further comprises a fourth mirror substantially parallel to the second mirror, and optically cooperating with the second mirror, the third and fourth mirrors substantially perpendicular to each other and the first and second mirrors substantially perpendicular to each other.

Preferably the above recited optical components comprise a first set, and the system further comprises a second set substantially identical to the first set, and means are provided for pivoting the third mirror of each set about a pivot access in response to movement of the mirror cluster in the substantially linear direction, to ensure substantially effective convergence, i.e. so that a fused binocular image is maintained even when the object to be viewed is close to the objective lens or lenses (e.g. a meter or closer). The means for automatically pivoting the third mirror may be as described above, as may the other components as set forth above.

The system is preferably mounted on a pair of eyeglasses, and a motorized system for auto-focusing may be provided for moving the mirror cluster. For example the mirror cluster may be mounted for movement by a traveling nut, and a threaded rotatable shaft parallel to the linear movement of the mirror cluster, rotation of the shaft (such is powered by a small motor) may effect substantially linear movement of the mirror cluster.

It is the primary object of the present invention to provide a lightweight, efficiently, universally, and effectively focusable, optical system for use by low visions persons, such as in association with eyeglasses. This and other objects of the invention will become clear from an inspection of the detailed description of the invention and from the appended claims.

DETAILED DESCRIPTION OF THE DRAWINGS

Figure 1:
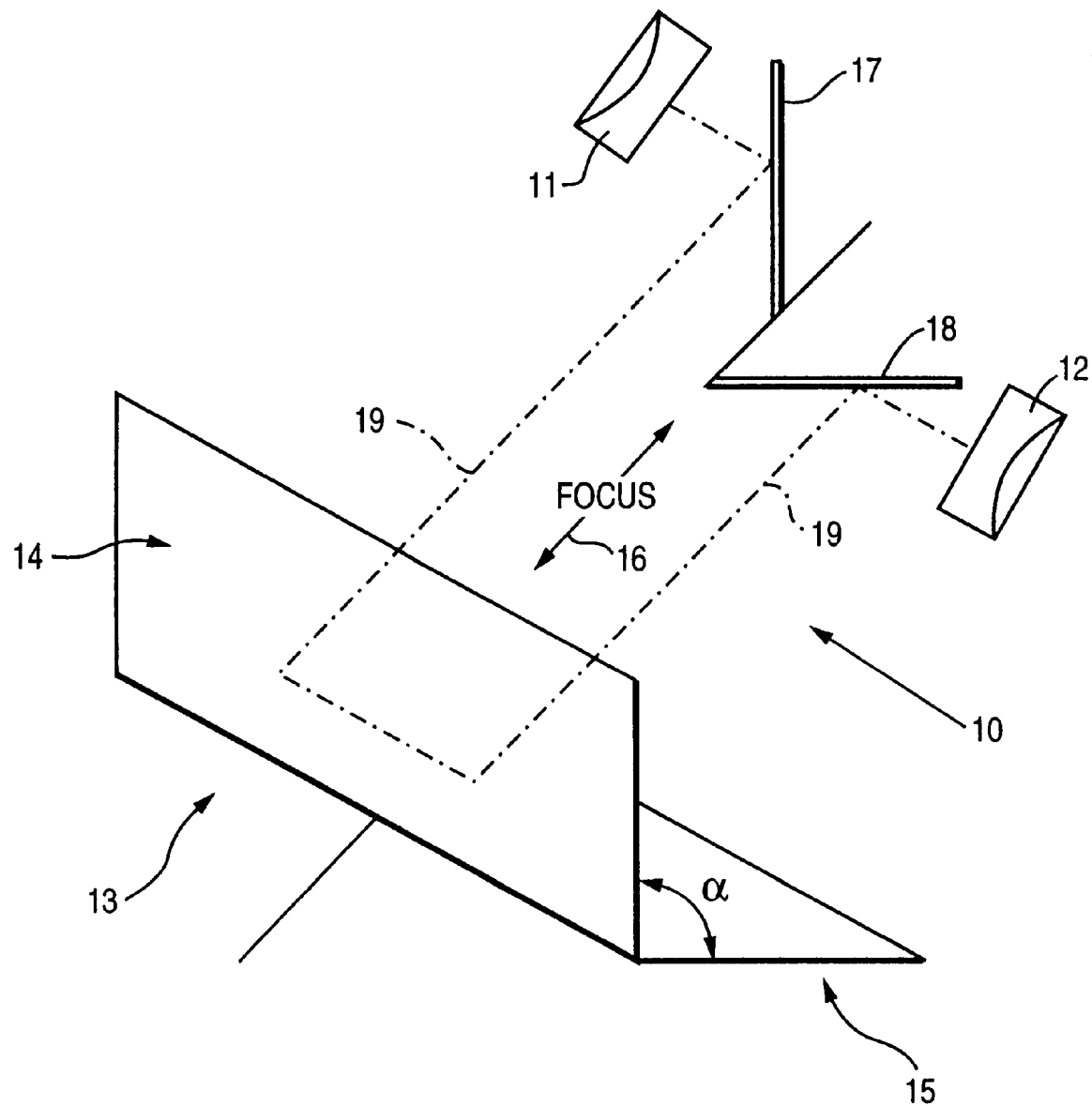
FIG. 1 is a schematic illustration of various optical components provided in a system according to the invention, which illustrate the most basic operating features of the invention.

FIG. 1 illustrates some basic aspects of the optical system per se according to the present invention, which is shown generally by reference numeral 10. The system 10 includes an objective lens 11, an eyepiece lens 12, and a mirror cluster 13 comprising first 14 and second 15 substantially planar mirrors which are disposed at an angle α with respect to each other of substantially 90°. The mirror cluster 13 is mounted for movement in a substantially linear path, as indicated by the arrows 16, to effect focusing of the optical system. In the preferred embodiment illustrated, the optical system 10 further comprises a third mirror 17 and a fourth mirror 18. The mirrors 17, 18 are substantially stationary, the mirror 17 being substantially parallel to the first mirror 14, and the fourth mirror 18 being substantially parallel to the second mirror 15. With the system of FIG. 1, the light path, as indicated by the dotted lines 19, is through the objective 11, reflecting off a third mirror 17, then reflecting off the first and second mirrors 14, 15, reflecting off the fourth mirror 18, and to the eyepiece 12. In the embodiment illustrated in FIG. 1 the objective 11 and eyepiece 12 lenses are mounted on substantially parallel lines of sight, and the mirror cluster substantially linear path of movement 16 is substantially transverse to the lines of sight of the lenses 11, 12. As will be described with other embodiments below, however, the lines of sight of the lenses 11, 12 may be substantially perpendicular rather than substantially parallel.

A characteristic feature of the optical system 10 of FIG. 1 is that one unit of travel of the mirror cluster 13 in the direction 16 provides two units of focus adjustment, and since the mirrors 14, 15 are lightweight, they may be readily moved either under manual or motor power in the substantially linear direction 16.

Figure 2:
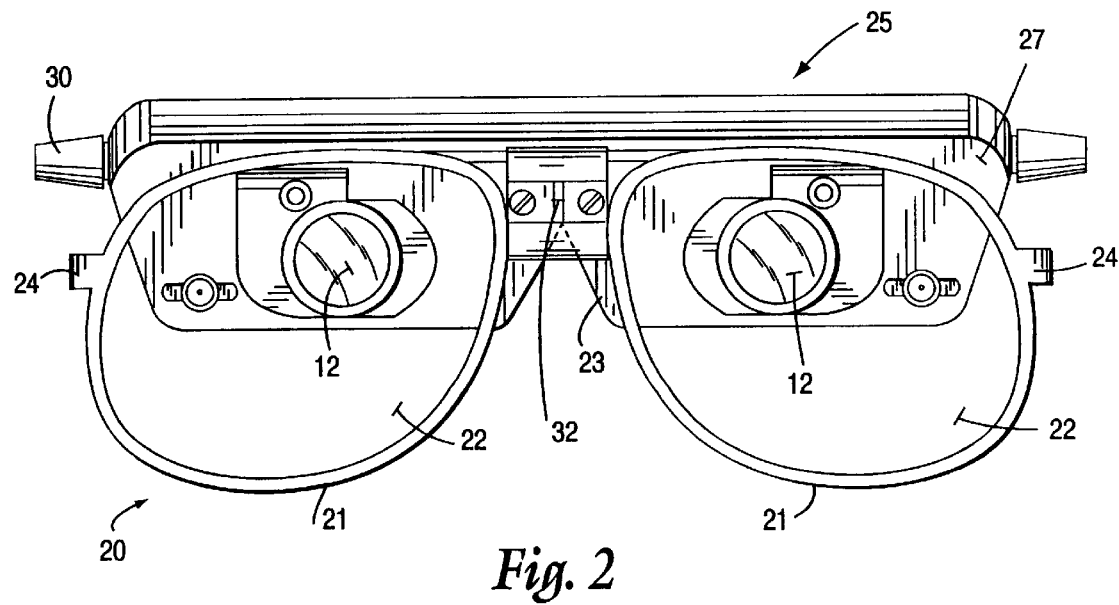
FIGS. 2 and 3 are rear and front views, respectively, of a binocular optical system according to the present invention mounted in association with eyeglasses.
Figure 3:
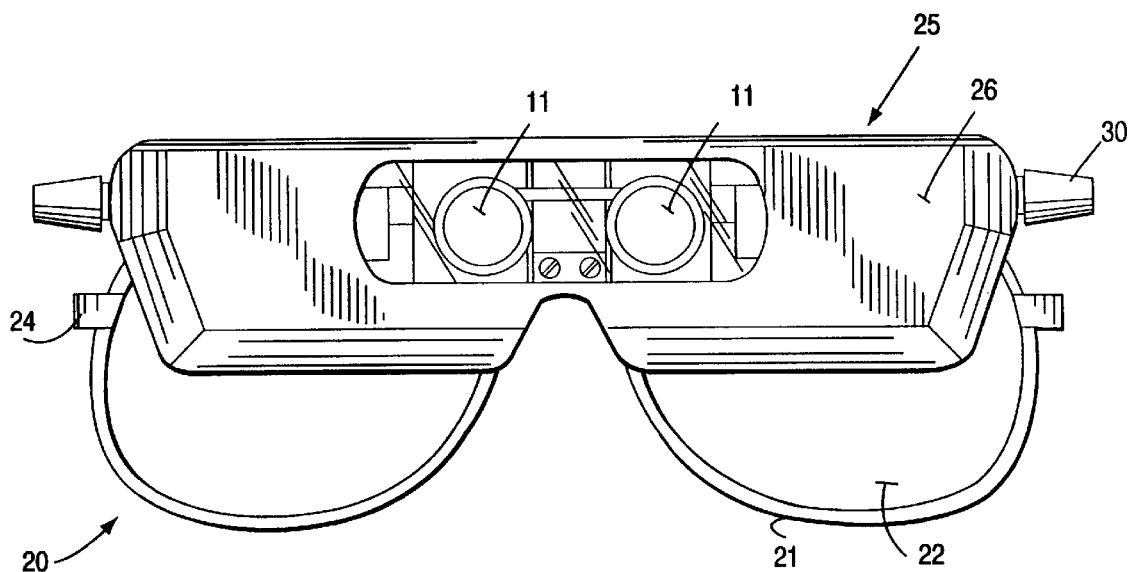
Figure 4:
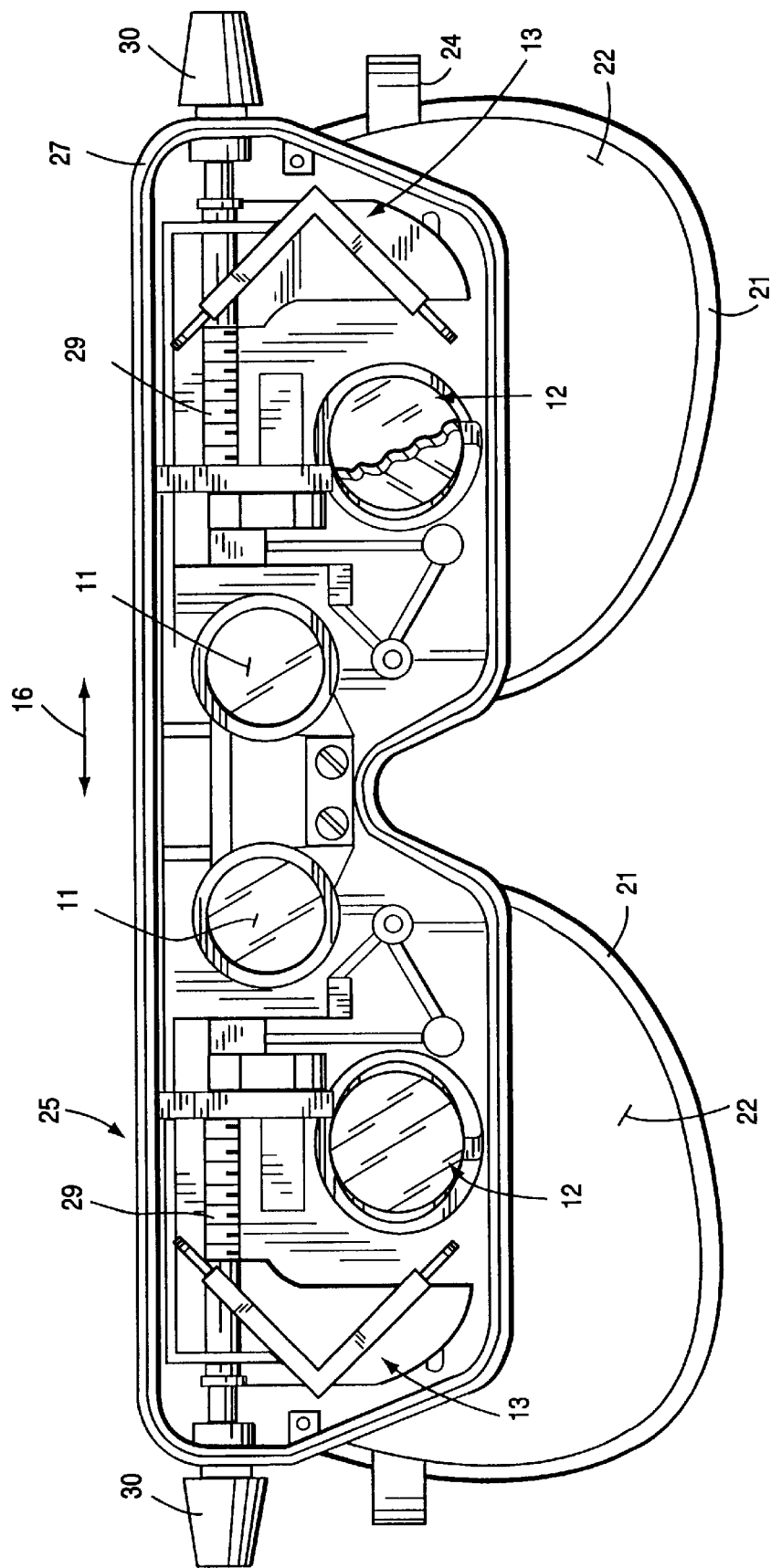
FIG. 4 is a view like that of FIG. 3 only showing the front of the casing removed so as to illustrate the internal components.

FIGS. 2 through 4 show a binocular version of the optical system 10 of FIG. 1 mounted in a casing in association with conventional eyeglasses 20, including frames 21 for eyeglass lenses 22, a nose piece 23 (see FIG. 2), and pivot sockets 24 for receipt of ear pieces (not shown). The lenses 22 may be prescription lenses, or just plain pieces of glass, or even absent altogether, depending upon a particular wearer's needs.

The binocular version of the optical system according to the invention is mounted in a casing 25. The casing 25 includes a front portion 26 (see FIG. 3) and a rear portion 27 (see FIGS. 2 and 4), the front portion 26 having been removed in FIG. 4. In FIG. 4, the lenses 11, 12 and the mirror clusters 13 are visible, but the third and fourth mirrors 17, 18 are not. The movement of the mirror clusters 13 in this embodiment is accomplished utilizing a pair of threaded shafts 29 on which the clusters 13 are mounted, rotation of the knobs 30 resulting in rotation of the shafts 29 in a conventional manner, and thereby substantially linear travel of the clusters 13 in the direction 16.

As seen in FIG. 2, the eyepieces 12 are mounted by the casing 25 so that they are adjacent the pupils of the eyes of the person wearing the eyeglasses 20. The casing 25 can be connected to the eyeglasses 20 in any suitable manner, such as by using the removable bracket 32 (see FIG. 2) which is clamped over the conventional cross-portion of the conventional nosepiece 23. Other suitable mounting structures may be provided, such as in the Goldberg article discussed above.

Figure 5:
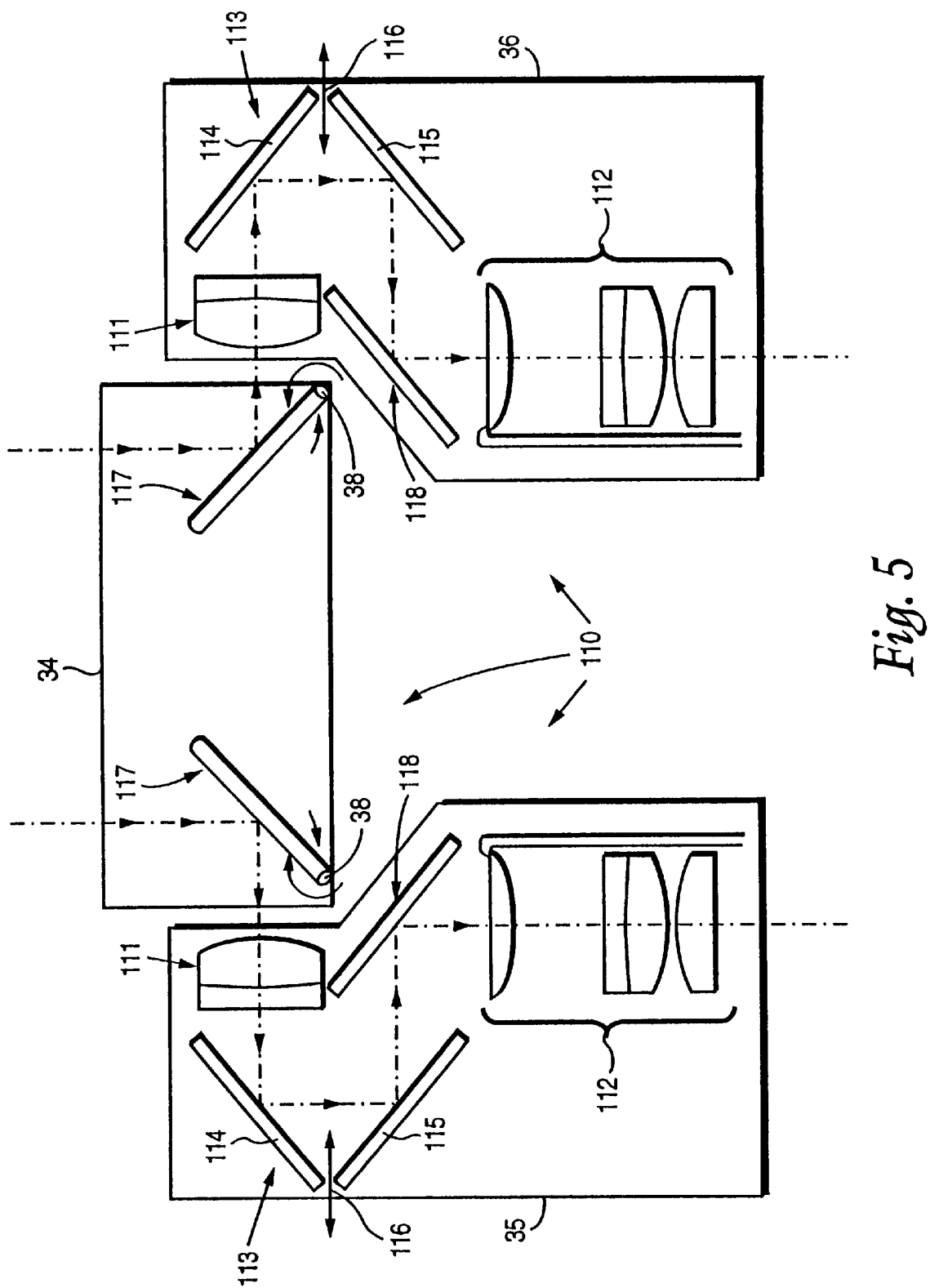
FIGS. 5 through 7 are schematic two dimensional representations of three embodiments of three dimensional optical systems according to the invention.
Figure 6:
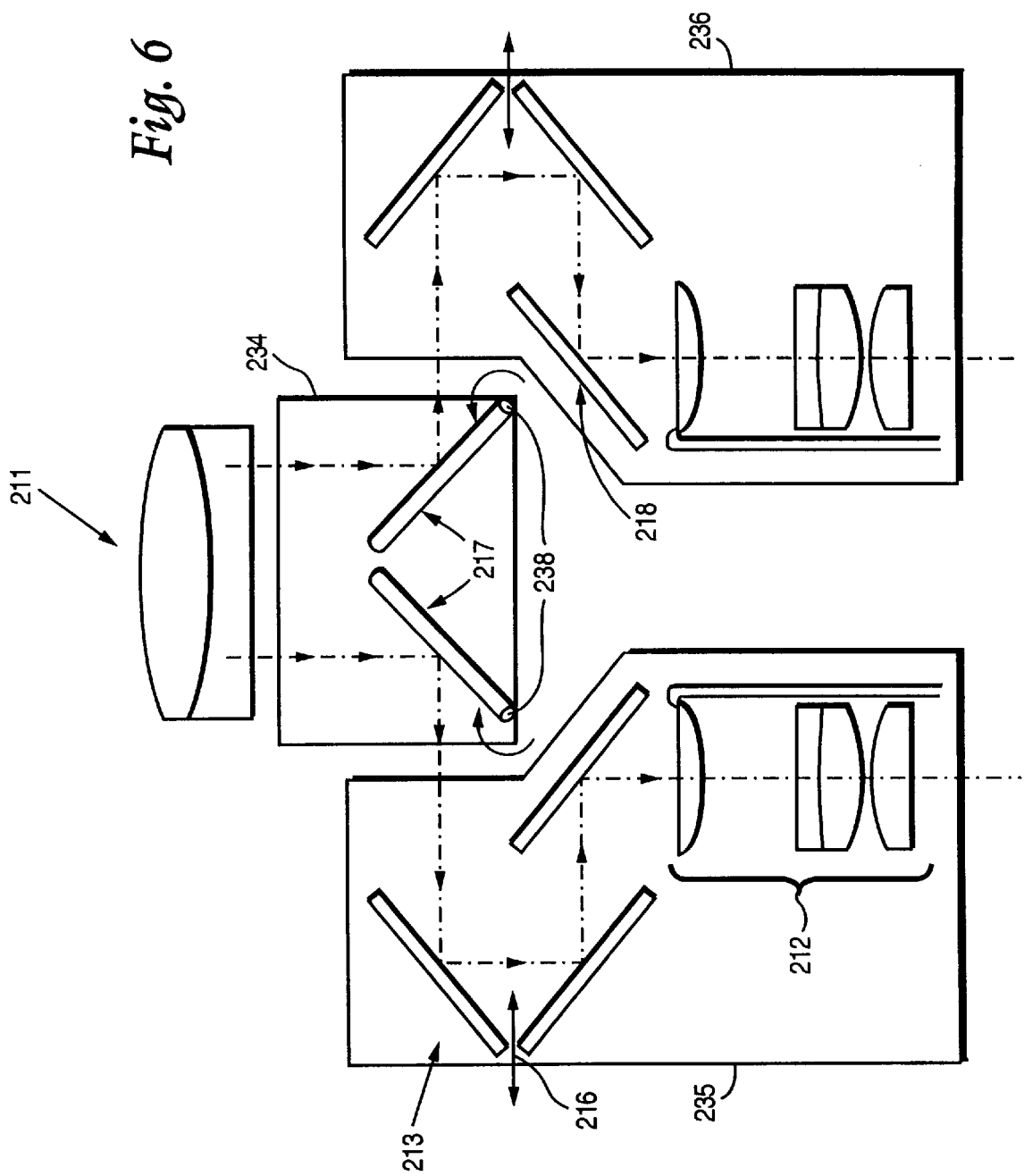
Figure 7:
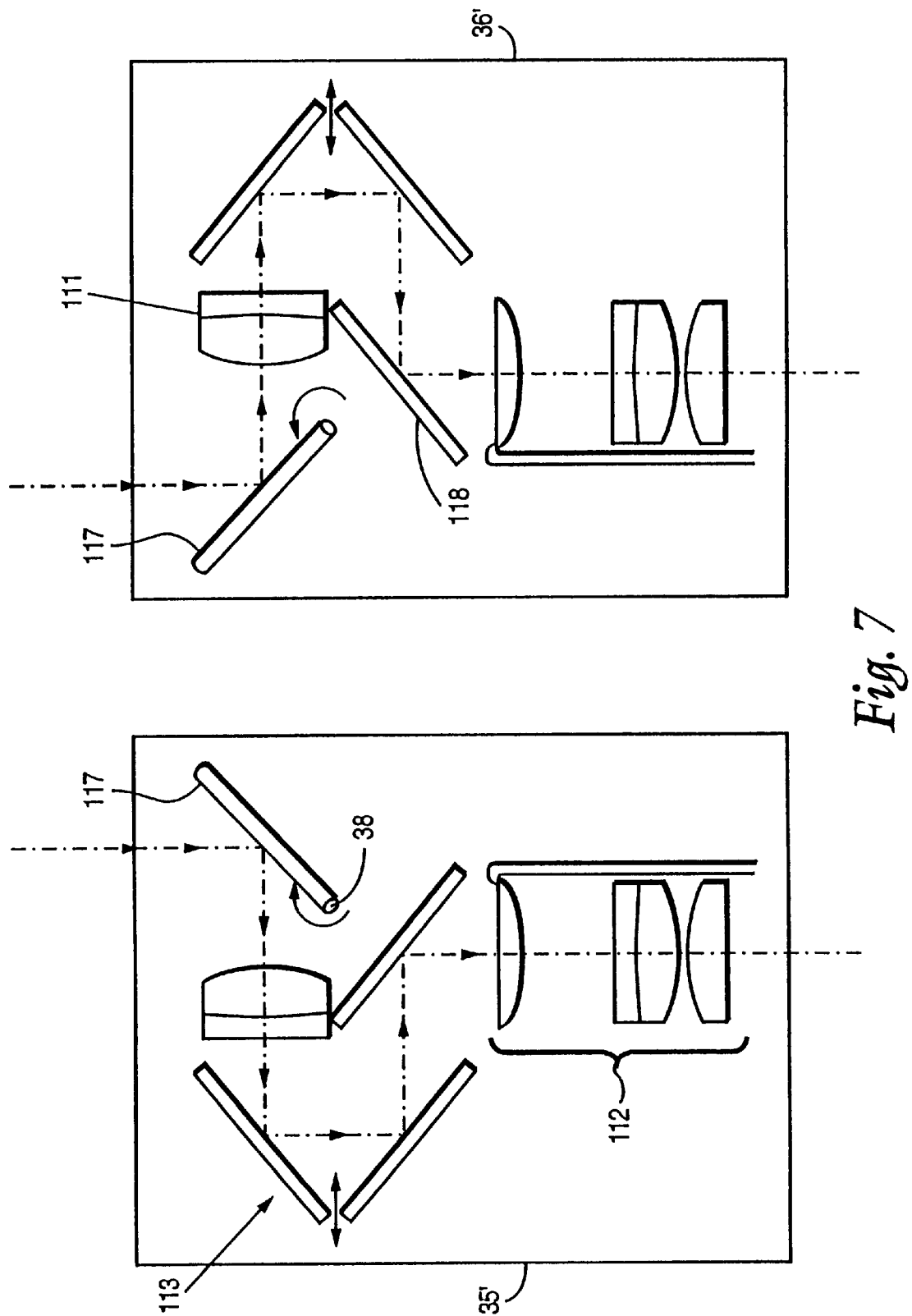

FIGS. 5 through 7 show two dimensional representations of various arrangements of the individual components of the optical system according to the invention, like the optical system 10. In these figures the components are illustrated schematically for ease of illustration, and are shown mounted in various housings, which housings could be connected together by common components. A three dimensional representation of one side of the FIG. 5 embodiment is illustrated in FIG. 10.

Figure 10:
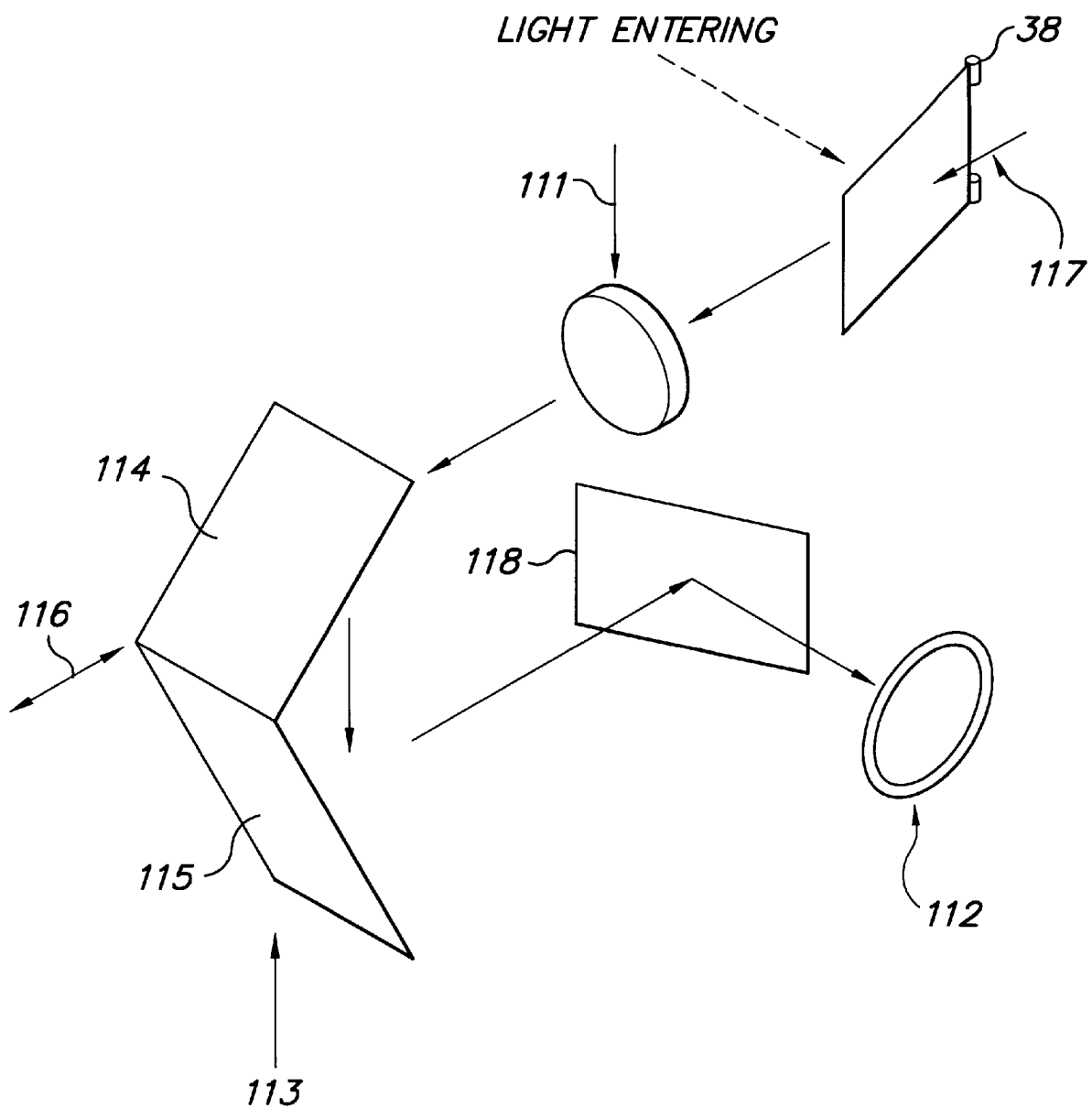
FIG. 10 is a three dimensional representation of one side of the optical system of FIG. 5.

In FIGS. 5 and 10 the optical system is shown generally by reference numeral 110. In FIGS. 5 and 10 components comparable to those in the FIG. 1 embodiment are shown by the same reference numeral only preceded by a "1" FIG. 5 illustrates a binocular system, although a monocular system, as in FIG. 10, may be provided instead. The optical system 110 serves to enlarge and erect the image for the eyes of the low vision person.

The system 110 of FIG. 5 includes three housings, or modules, 34, 35, and 36. The module 34 contains the third mirror 117 for each of the two sets of optical components comprising the binocular system. Since a binocular system is provided in FIG. 5, and since it is desirable to ensure substantially effective convergence even when the object to be viewed is close to the viewer (e.g. about a meter or less from the objective lens or lenses 111, 211), the mirrors 117 preferably are pivoted, as indicated schematically at 38 in FIG. 5, for pivotable movement about an axis substantially transverse to the substantially linear path 116 of adjustment of each of the clusters 113. In the FIG. 5 embodiment the eyepiece lens 112 is provided by three different components.

As with the FIG. 1 embodiment, the fourth mirror 118 in the FIGS. 5 and 10 embodiment is substantially parallel to the second mirrors 115, and the third mirrors 117 are substantially parallel to the first mirrors 114, although pivoting to ensure substantially effective convergence. In the FIGS. 5 and 10 embodiment the third mirror 117 is located in the light path before the objective 111, and the light path through the objective 111 is substantially perpendicular to the light path through the eyepiece 112.

In the FIG. 6 embodiment components comparable to those in the FIG. 1 embodiment are shown by the same reference numeral only preceded by a "2" Structures comparable to those in the FIG. 5 embodiment are also shown by the same two digit reference numeral only preceded by a "2" The main difference between the FIG. 6 embodiment and the FIG. 5 embodiment is that there is only a single, common, objective 211, which is mounted in association with the housing 234 and in the optical path before the pivotally mounted third mirrors 117.

In the FIG. 7 embodiment the components are identical to those in the FIG. 5 embodiment, and are shown by the same reference numeral, except that the housings 36' and 35' also contain the third mirrors 117.

Figure 8:
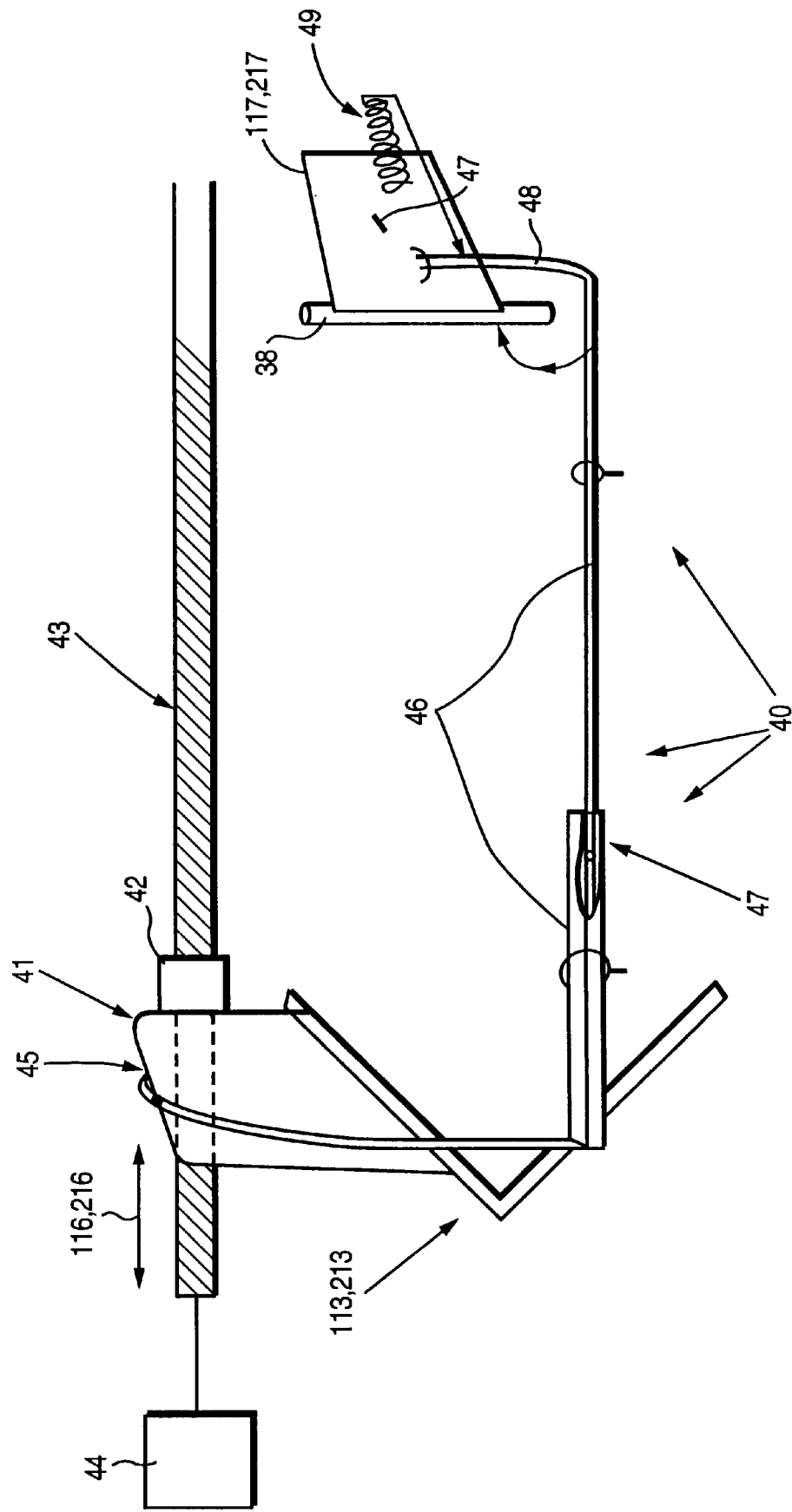
FIGS. 8 and 9 are schematic illustrations of two different embodiments of means for automatically pivoting the third mirror in any of the optical systems according to the invention, in response to movement of the mirror cluster to ensure proper convergence in a binocular system.

FIG. 8 schematically illustrates an exemplary means according to the present invention for automatically pivoting a third mirror 117, 217 about a pivot access 38 upon adjustment of the mirror cluster 113, 213, and a particular mechanism for adjusting the mirror cluster 113, 213. The major components of the automatic adjustment means— shown generally by reference numeral 40 in FIG. 8—include the convergence cam 41 which can engage or preferably is mounted on an internally threaded block 42, which in turn receives the screw threaded focusing shaft 43. The block 42 is a conventional traveling nut so that rotation of the shaft 43 results in reciprocation of the block 42 in the direction 116, 216. The shaft 43 is rotated by the actuator 44 which may be a manual knob (like the knob 30 in FIGS. 2 through 4), or a motor, such as in the Goldberg article referenced above.

The automatic pivoting means further comprises a cam follower 45 which engages the convergence cam 41, and a link 46 connecting the cam follower 45 to the non-reflective side 47 of the mirror 117, 217. The link 46 includes a conventional slip joint 48 which allows relative linear movement between the third mirror 117, 217, and the mirror cluster 113, 213, while translating pivotal movement of the cam follower 45 to pivotal movement of the third mirror 117, 217 about the pivot axis 38. Note that actual connection between the link 46 and the backside 47 of the mirror 117, 217 may be provided by the arm 48 which is generally transverse to the link 46. If desired, a spring (such as a conventional small coil spring) 49 may be provided engaging the back surface 47 of the mirror 117, 217 to bias it to a desired position.

In operation of the automatic adjustment means 40, the motor or knob 44, the focusing block 42, and the convergence cam 41, are calibrated so that when the object to be viewed is about one meter away from the objective lenses 111, the cam 41 as moved with the block 42 will move the cam follower 45 to start pivotal movement of the mirror 117, 217 about pivot 38 to ensure proper convergence so that the image of the object remains fused. The means 40 associated with the other mirror 117, 217 of the binocular system does the same thing, substantially synchronously.

Figure 9:
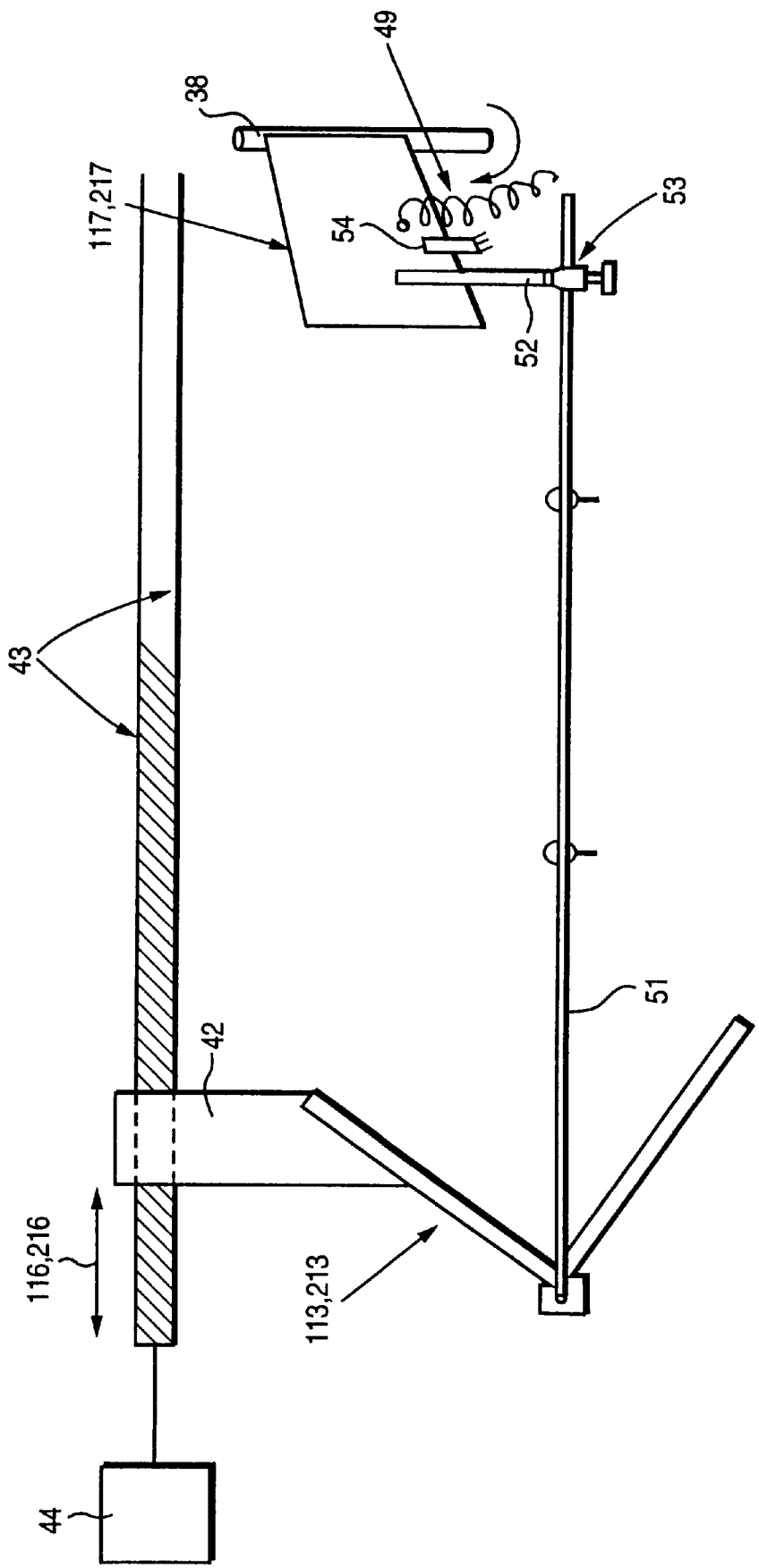

FIG. 9 shows an alternative means for automatically pivoting the third mirror 117, 217 about a pivot axis defined by shaft 38. In this embodiment structures that are the same as those in the FIG. 8 embodiment are shown by the same reference numeral.

One difference between the FIG. 9 and FIG. 8 embodiments is that in FIG. 9 there is no cam or cam follower or link slip joint. Rather the link arm 51 is fixedly secured to the arm 52, but in a length-adjustable manner, such as by using a conventional sleeve and screw arrangement 53. That is depending upon the expected wearer's normal pupillary distance, a tightening screw of the adjustment mechanism 53 is loosened, and the link 51 is slid with respect to the arm 52, and then the screw of the length adjustment 53 tightened again. However since the system of the invention is not typically worn by more than one individual, once a proper adjustment is made it normally need not be adjusted again. Other conventional structures for adjusting pupillary distance, per se, may alternatively be used for any embodiment.

Another difference between the FIGS. 8 and 9 embodiments is that in the FIG. 9 embodiment the arm 52 is not fixed to the mirror 117, 217, but rather lost motion is provided therebetween until the nut 42 gets to the position where convergence is required. That is, the components 42, 44, 52, etc. are calibrated so that when the object to be viewed is about one meter from the objective 111, 211 the arm 52 engages the back of mirror 117, 217 and moves it away from a conventional stop 54 stopping movement under the influence of spring 49, and starts pivotal movement of the mirror 117, 217 in the direction of the arrow in FIG. 9.

While FIGS. 8 and 9 show two exemplary means for automatically pivoting the third mirror 117, 217 in response to mirror cluster 113, 213 movement, any suitable conventional structure which can change substantially linear movement of one element into accurate pivotal movement of another may be utilized.

Other modifications may be provided according to the invention. For example a single actuator 44, such as centrally located, can be provided for adjusting both of the sets of optical components (in a binocular system) at the same time rather than providing individual adjustment as schematically illustrated in the drawings, and conventional equivalents may be provided for all components.

It will thus be seen that according to the present invention a highly advantageous optical system has been provided for low vision people, one that is readily mounted on conventional eyeglasses. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A vision enhancing optical system comprising:
   an objective lens;
   an eyepiece lens;
   a mirror cluster comprising first and second substantially planar mirrors which are disposed at an angle of substantially 90° with respect to each other; and said mirror cluster mounted for movement in a substantially linear path with respect to said objective and eyepiece lenses.

2. An optical system as recited in claim 1 wherein said objective and eyepiece lenses are mounted on substantially parallel lines of sight, and wherein said mirror cluster substantially linear path of movement is substantially transverse to said lines of sight.

3. An optical system as recited in claim 1 further comprising a third mirror disposed optically closer to said objective lens than said eyepiece lens; and a fourth mirror for directing light reflected by said mirror cluster to said eyepiece lens.

4. An optical system as recited in claim 3 wherein the above-recited optical components comprise a first set, and further comprising a second set of optical components including an eyepiece, lens, and four mirrors substantially identical to said optical components of said first set, said mirror cluster of said second set facing, or facing away from, said mirror cluster of said first set, and wherein said first and second sets comprise a binocular system.

5. An optical system as recited in claim 4 wherein each said third mirror is pivotally mounted for pivotal movement about a pivot axis substantially perpendicular to said substantially linear path of movement of said mirror cluster, to ensure substantially effective convergence.

6. An optical system as recited in claim 5 further comprising means for automatically pivoting each said third mirror in response to movement of said mirror cluster to ensure substantially effective convergence to fuse a binocular image when the object providing the image is about one meter or closer to said objective lens.

7. An optical system as recited in claim 6 wherein said mirror cluster is mounted for movement by a traveling nut, and a threaded rotatable shaft parallel to said linear movement of said mirror cluster, rotation of said shaft effecting substantially linear movement of said mirror cluster.

8. An optical system as recited in claim 7 wherein said means for automatically pivoting said third mirror comprises a link connected to said mirror cluster, and an arm having a lost motion connection to said third mirror, so that said arm does not engage said mirror to start pivoting thereof until said nut has moved to a position where the object to be viewed is about one meter away from said objective lens.

9. An optical system as recited in claim 8 further comprising an adjustment mechanism connecting said link to said arm to accommodate different pupillary distances.

10. An optical system as recited in claim 6 wherein said means for automatically pivoting said third mirror comprises a cam, a cam follower, and a link connecting said cam follower to said third mirror, said link including a slip joint allowing relative linear movement between said third mirror and said mirror cluster while allowing translating movement of said cam follower to pivotal movement of said third mirror when said cam engages said cam follower.

11. An optical system as recited in claim 5 wherein said third mirrors of said first and second sets are mounted in a first housing, and wherein said mirror cluster, eyepiece lens, and fourth mirror of said first and second sets, respectively, are mounted in second and third housings, respectively.

12. An optical system as recited in claim 11 wherein said objective lens is operatively mounted with said first housing and comprises a common objective lens to both said first and second sets of optical components.

13. An optical system as recited in claim 4 wherein said third mirrors of said first and second sets are mounted in a first housing, and wherein said mirror cluster, eyepiece lens, and fourth mirror of said first and second sets, respectively, are mounted in second and third housings, respectively.

14. An optical system as recited in claim 13 wherein said objective lens is operatively mounted with said first housing and comprises a common objective lens to both said first and second sets of optical components.

15. An optical system as recited in claim 4 wherein said second set of optical components comprises an objective lens; and wherein all said optical components of said first set are mounted in a first housing, and all those of said second set are mounted in a second housing.

16. An optical system as recited in claim 4 wherein said binocular system is mounted on an eyeglass frame with said eyepiece lenses adjacent the eyeballs of a human wearing said eyeglass frame.

17. An optical system as recited in claim 3 wherein said third and fourth mirrors are substantially perpendicular to each other, and said first and second mirrors are substantially perpendicular to each other, and said fourth mirror is substantially parallel to said second mirror.

18. An optical system as recited in claim 3 wherein said objective and eyepiece lenses are mounted on substantially parallel lines of sight, and wherein said mirror cluster substantially linear path of movement is substantially transverse to said lines of sight.

19. An optical system as recited in claim 3 wherein said objective lens is between said first and third mirrors.

\* \* \* \* \*